(12) United States Patent
Ferlitsch

(10) Patent No.: US 7,886,138 B2
(45) Date of Patent: Feb. 8, 2011

(54) METHODS AND SYSTEMS FOR FIRMWARE ACCESS AND MODIFICATION

(75) Inventor: Andrew Rodney Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 843 days.

(21) Appl. No.: 11/687,516

(22) Filed: Mar. 16, 2007

(65) Prior Publication Data

US 2008/0229086 A1  Sep. 18, 2008

(51) Int. Cl.
*G06F 3/12* (2006.01)
(52) U.S. Cl. ............................. 713/1; 713/2; 717/168; 710/10
(58) Field of Classification Search .................. 713/1, 713/2; 717/168; 710/10
See application file for complete search history.

(56) References Cited

U.S. PATENT DOCUMENTS

| | | | |
|---|---|---|---|
| 6,081,890 A * | 6/2000 | Datta | 713/1 |
| 7,024,051 B2 * | 4/2006 | Miller et al. | 382/263 |
| 7,145,682 B2 * | 12/2006 | Boldon | 358/1.15 |
| 7,174,548 B2 * | 2/2007 | Louzoun et al. | 717/173 |
| 2002/0118387 A1 * | 8/2002 | Patton | 358/1.15 |
| 2003/0043399 A1 | 3/2003 | Johnston | |
| 2003/0074659 A1 | 4/2003 | Louzoun | |
| 2003/0185220 A1 | 10/2003 | Valenci | |
| 2004/0120001 A1 | 6/2004 | Boldon | |
| 2004/0210894 A1 * | 10/2004 | Zarco | 717/171 |
| 2005/0185055 A1 | 8/2005 | Miller | |
| 2006/0031666 A1 | 2/2006 | Yasuda | |
| 2006/0149955 A1 | 7/2006 | Velhal | |

FOREIGN PATENT DOCUMENTS

| | | |
|---|---|---|
| EP | 0429252 B1 | 5/1991 |
| JP | 03162983 | 7/1991 |
| JP | 08123635 | 5/1996 |
| JP | 2002063098 | 2/2002 |

* cited by examiner

*Primary Examiner*—Abdelmoniem Elamin
(74) *Attorney, Agent, or Firm*—Krieger Intellectual Property, Inc.; Scott C. Krieger

(57) ABSTRACT

Embodiments of the present invention comprise systems and methods for accessing and modifying device firmware.

20 Claims, 7 Drawing Sheets

METHODS AND SYSTEMS FOR FIRMWARE ACCESS AND MODIFICATION

FIELD OF THE INVENTION

Embodiments of the present invention comprise methods and systems for firmware access and modification.

BACKGROUND

Many devices employ firmware to enable device functions and interface with users. Generally, these firmware-enabled functions are accessible to any user. These functions are also typically only modified by rewriting the firmware code. These firmware rewrites typically require special equipment or processes that make frequent code modification inconvenient.

SUMMARY

Some embodiments of the present invention comprise methods and systems for firmware access and modification. In some embodiments, temporary "firmware" modules are linked to resident firmware modules to enable additional functionality in the device. In some embodiments, these temporary modules are restricted to specific authenticated users who have permission to use the functions of the temporary modules. In some embodiments, if a user is not authenticated, the temporary modules will not be loaded or linked and access will be denied.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
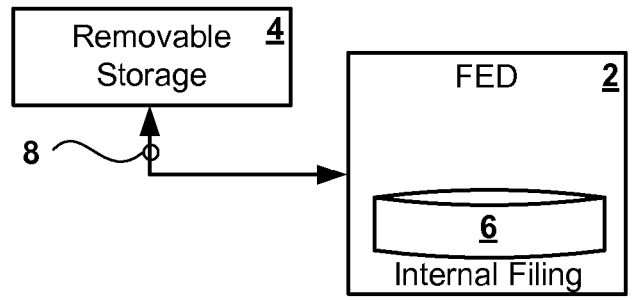
FIG. 1 is a diagram showing an exemplary operating environment.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention comprise methods and systems for customizing the firmware of a firmware-enhanced device (FED) on-the-fly. In some embodiments, these customizations may be temporary. In some embodiments, these customizations may be performed on host-based firmware that may be stored remotely to the FED. In other embodiments, the customizations may be performed on FED-centric firmware stored with the FED.

An FED may be any device comprising firmware, which is associated with the control and functionality of the device. In some embodiments, an FED may comprise a printer, a scanner, a facsimile device, a copier, a filing device, a publishing device, an A/V Recorder/Player, a display, a medical imaging device (e.g., X-Ray, CAT-SCAN, etc), a cell phone, a personal digital assistant (PDA) device, a laptop computer, an MP3 player, a software application and/or other devices or functionality. In some embodiments, an FED may comprise a multi-function peripheral device (MFP), which may comprise a plurality of the above devices, applications or functions.

In an exemplary embodiment, the operating environment may comprise one or more FEDs, which comprise a walkup user interface (e.g., front panel) and/or a remote user interface (e.g., embedded web page, PC driver, email, ftp, Web Service, etc).

In some embodiments, an FED/MFP may be communicatively coupled with at least one removable or external storage device. Exemplary storage devices may comprise a USB thumb drive, memory card, CD/DVD reader/writer, a floppy drive, a PDA, a laptop/PC or another device comprising accessible memory or storage. Additionally, in some embodiments, an FED/MFP may have internal filing storage.

In some embodiments of the present invention, firmware modules within a processing pipeline may have one or more configurable end-points, which allow the processing pipeline to be dynamically reconfigured on-the-fly. Some embodiments may comprise systems and methods for the FED to export information about the end-points. In these embodiments, customized firmware services may bind with the end-points.

Some embodiments of the present invention may comprise methods and systems for restricting access to firmware. In some embodiments, firmware access may be restricted to one or more authenticated users. Some embodiments may automatically apply temporary firmware on a per job basis if firmware associated with the authenticated user of the job is available.

Some embodiments of the present invention may be described in relation to FIG. 1. In these embodiments, a firmware-enhanced device (FED) 2 may comprise internal storage 6 in which firmware may be stored. Internal storage 6 may comprise memory, e.g., ROM, RAM, and Flash memory as well as magnetic, optical, magneto-optical and other storage devices, e.g., hard drives, compact disk (CD) drive and others. A FED 2 may, additionally or alternatively, comprise a communication link 8 to a removable storage device 4. A removable storage device 4 may comprise a memory or storage device similar to internal storage 6, but in a portable form. In some embodiments, a removable storage device may comprise a memory device with a serial interface such as a universal serial bus (USB) interface, an IEEE 1394 interface, a Compact Flash interface, a Secure Digital interface or another interface that provides access to stored digital code. In other embodiments, the removable storage may be connected in a wireless manner via a proximity protocol, such as Bluetooth or inductive coupling.

In some embodiments of the present invention, processing pipelines within the FED's firmware may be broken down into independently-bound firmware modules. In some exemplary embodiments bindings may comprise: binary link editing, web services, etc. A job task performed by an FED may comprise the operation of one or more of these pipelines. Each module may comprise an output interface which may comprise end-points. In some embodiments, a firmware module may comprise three types of end-points (e.g., output connectivity to the next firmware module):

1. Internal end-point—default (predefined) binding within the pre-existing processing pipeline configuration.
2. External end-point—optional on-the-fly alternative binding.
3. Loopback end-point—optional on-the-fly post-processing alternate binding, whose output is loopback to the internal end-point of the firmware module.

In exemplary embodiments, a firmware binding may be created from binary loadable code, which may be stored internally on an FED. In other exemplary embodiments, a firmware binding may be created from externally-hosted code that is stored external to the FED, but referenced by a link, such as a uniform resource locator (URL). In some embodiments, the code may be stored on a removable storage/memory device.

When an FED, such as an MFP, executes a job, the job may be associated with a set of processing pipelines in the FED. Each processing pipeline may have a set of connected firmware modules. During run-time, when a processing pipeline is invoked, a dynamic loader/linker may configure/bind the firmware modules to form (on-the-fly) the processing pipeline.

In some embodiments of the present invention, a pipeline or set of temporary firmware modules may be task-specific. In some exemplary embodiments, a separate pipeline may be designated for printing, scanning, translation, rasterization, PDL interpretation, network application interfacing, and/or ISO stack functions.

The configuring/binding may occur in a number of ways. In some embodiments, the configuration/binding information may come from two sources: a predetermined (built-in) binding and/or externally-loaded temporary binding. A temporary binding may be loaded by any means, such as from removable storage or external storage media. When loaded, the temporary module may be associated with one or more authenticated users. For example, the temporary binding may be associated with a network login/password of a user. In some embodiments, the FED may further be connected to a domain server, to verify the authenticity of the login user/password.

In some embodiments, a temporary firmware module may be associated with one or more authenticated user login procedures. In some embodiments, this association may comprise metadata that identifies authenticated user logins. In some embodiments, the metadata may be embedded in the module at a predetermined location.

In some embodiments, a user may log in at a control panel that is integral to an FED, such as a keypad, smartcard or bio-reader on an MFP. In other embodiments, a user may log in through a remote login process via login commands embedded in a job that is sent to an FED. In an exemplary embodiment, a print job may comprise login commands to be interpreted at an FED/MFP. These login commands may be entered at a remote PC or another remote device with a user interface.

When the loader/linker starts configuring/binding a pipeline it may check sources to determine the presence of a temporary binding. The FED/MFP may first determine the authenticated user associated with the job, for which the pipeline is being configured. In some embodiments, if the job does not have an authenticated user, the FED/MFP may only configure temporary bindings that have a public access. Otherwise, only temporary firmware bindings associated with the authenticated user will be accessible to the loader/linker.

If there are no accessible temporary bindings present for the processing pipeline, then the loader/linker may perform the default behavior of configuring/binding the processing pipeline according to the predetermined bindings. Otherwise, e.g., when one or more temporary bindings exist for the processing pipeline, the loader/linker may configure/bind using the temporary bindings, which override a default binding. In some embodiments, as mentioned above, the temporary firmware modules may be bound either to an external end-point or loopback end-point, of an existing firmware or temporarily-bound firmware module.

In the case of an external end-point, the output from the existing firmware module may be linked to the input of the temporary firmware module. In some embodiments, the output of the temporary firmware module may then be linked to the next firmware module (if any), according to the information specified in the temporary bindings.

In the case of a loopback end-point, the output from the existing firmware module is linked to the input of the temporary firmware module. But, the output of the temporary firmware module is now linked back to the default end-point of the existing firmware module, where the output would then pass to the next firmware module, if any, which would be bound to the existing firmware's default (predetermined) end-point.

Figure 2:
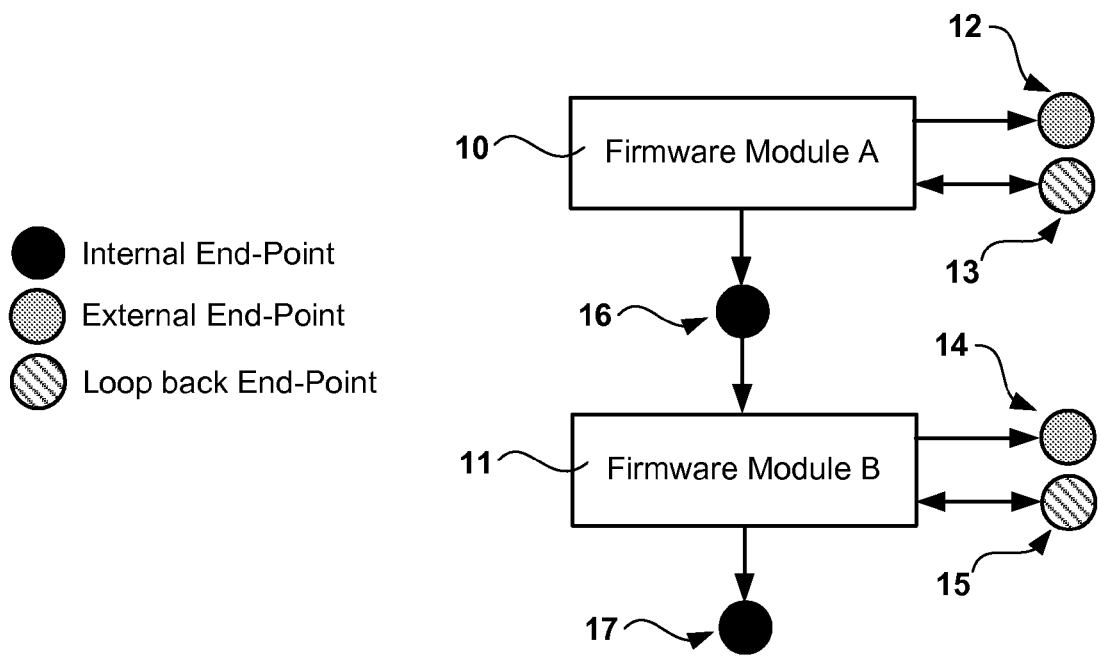
FIG. 2 is a diagram showing exemplary configurable firmware modules.

Some embodiments of the present invention may be described with reference to FIG. 2. In these embodiments, firmware modules 10 and 11 comprise modular end-points 12-17, which may be configured by binding them to other modular end-points 12-17. In these exemplary embodiments, these modular end-points 12-17 comprise internal end-points 16 and 17, external end-points 12 and 14 and loop-back end-points 13 and 15. In some embodiments, firmware modules may comprise any combination of internal, external and loop-back end-points. In a default or unmodified configuration or binding, external and loop-back end-points 12-15 are not used. Internal end-points 16 and 17 are default outputs for their respective modules 10 and 11. In this example, the default output from module A 10 exits by internal end-point 16 and becomes input to module B 11. However, embodiments of the present invention may reconfigure or bind these end-points 12-17 to direct output to other modules including existing conventional modules (not shown), other firmware modules 10 and 11 with modular end-points 12 and 17 and temporary firmware modules (not shown), which may comprise modular end-points and are explained further herein.

Figure 3:
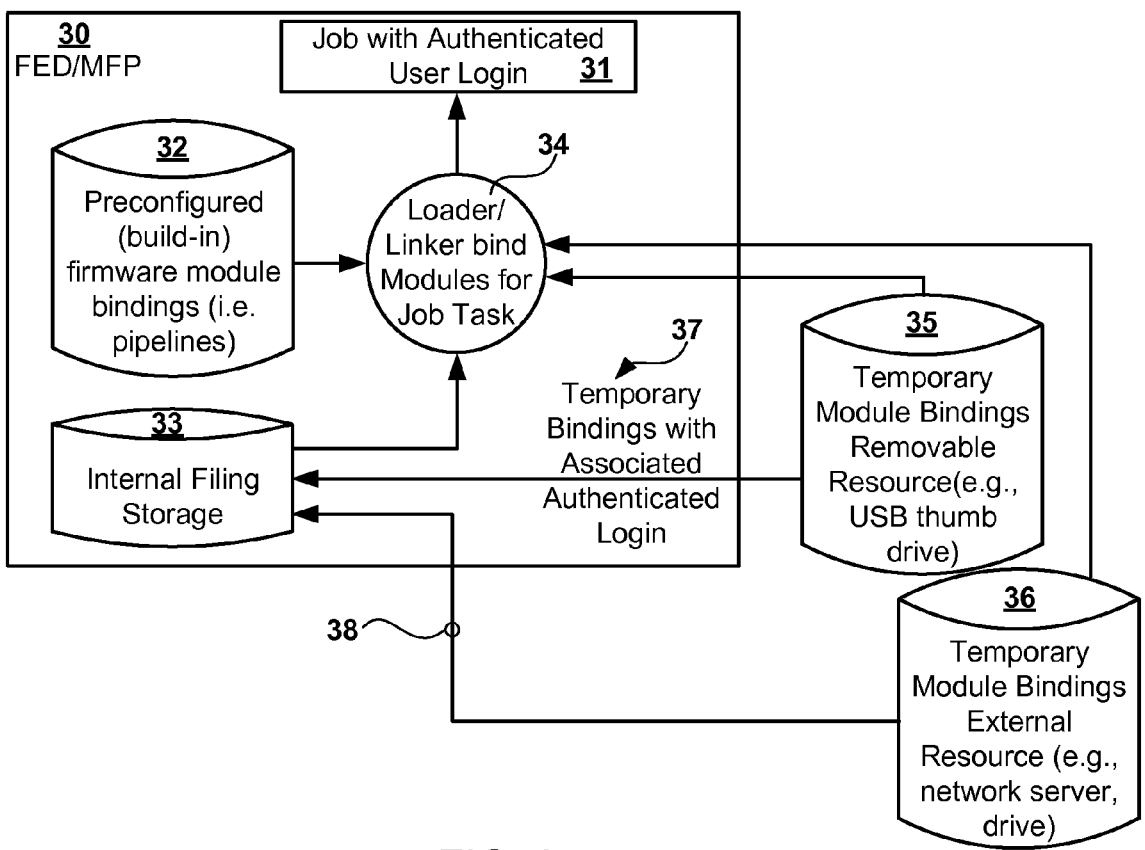
FIG. 3 is a diagram showing an exemplary system comprising resident firmware modules and non-resident temporary modules.

Some embodiments of the present invention may be described with reference to FIG. 3. In these embodiments, an FED 30, such as an MFP may comprise pre-configured firmware modules 32 with default binding configurations. The FED 30 may also comprise internal storage 33, which may store temporary modules along with binding data, end-point configuration data, user authentication data and other associated information. Temporary modules and their associated data may reside in internal storage 33 permanently, on a long-term basis or temporarily. In some embodiments, temporary modules may be loaded into internal storage from a removable resource 35, such as a USB drive, memory card, portable hard drive, CD/DVD or another removable resource. Temporary modules and associated data may also be loaded into internal storage from an external resource 36, such as a network server, drive or some other resource.

In these embodiments, a job 31 may be received at the FED 30. This job may originate at the FED 30, where it may be initiated by user input or the job may be received at the FED 30 over a communication link such as a network connection. The job 31 may also comprise authenticated user login data identifying an authenticated user. In some embodiments, the job 31 may comprise user login data that may be authenticated within the FED 30 or through a remote resource.

When the job 31 is received at the FED 30, the FED 30 determines which firmware modules and temporary modules are required to accomplish the job 31. The loader/linker 34 then loads the necessary modules and links the module endpoints as needed to accomplish the job 31. The loader/linker 34 may access modules, binding data and module-related data from pre-configured firmware modules 32 in the FED 30, from internal storage 33, from removable resources 35 or from external resources 36.

In some embodiments, the FED/MFP may detect the presence (or absence) of a temporary firmware module by any means. For example, the temporary firmware module may be stored on removable storage (e.g., USB thumb drive). In some embodiments, when the removable storage is connected to the FED/MFP, the temporary firmware modules become available, and when disconnected, become unavailable for use.

In some embodiments, temporary firmware modules may be stored within the FED, e.g., in filing storage. These temporary firmware modules may be available as long as they remain in the filing storage. When removed from the filing storage, the temporary firmware modules may become unavailable for use.

In some embodiments, a temporary firmware module may be in a binary format. In some embodiments, a temporary firmware module may be accessed by a URL reference to an externally hosted module (e.g., Web Service). If the firmware module is in a binary format, then the loader/linker may load the firmware module temporarily into memory and directly bind with any internal firmware modules. In some embodiments, if the firmware module is externally hosted, then the loader/linker may establish a communicatively-coupled connection with the externally-hosted module, located at the specified URL, according to a predefined interface definition, and serialize/deserialize any data that is exchanged.

In some embodiments, each resident (built-in) firmware module may have an interface definition associated with the module defining how to communicate (e.g., methods) and exchange data, such as a WSDL/Schema. In some embodiments, the interface definition may be exported to removable/external storage. The interface definition may then be used by an end-user to design a temporary firmware module.

As mentioned above, when a processing pipeline is invoked, the loader/linker may attempt to bind the firmware modules into a connected set of processes for performing the processing pipeline. Each processing pipeline may have a predetermined set of firmware modules and bindings which compose the processing pipeline in its default configuration. This may be the built-in configuration in the absence of any redefinition. This default binding information may be stored in the device and may be accessible by the loader/linker.

When the loader/linker constructs a processing pipeline it may check both the default and temporary binding information associated with the pipeline. It may first determine if the job task is associated with an authenticated user login. If not, the job task may be treated as public. The loader/linker may then search the temporary bindings which are either public or are associated with the same authenticated user login.

If no temporary bindings are associated at the time of the construction, then the loader/linker will configure/bind the firmware modules according to the default bindings. In an exemplary embodiment, a binding may comprise:

1. Identifying an end-point of a first firmware module (e.g., out value of a method),
2. Identifying an input of a second firmware module (e.g., in value of a method), and
3. Connecting the end-point of the first firmware module to the input of a second firmware module.

Figure 4:
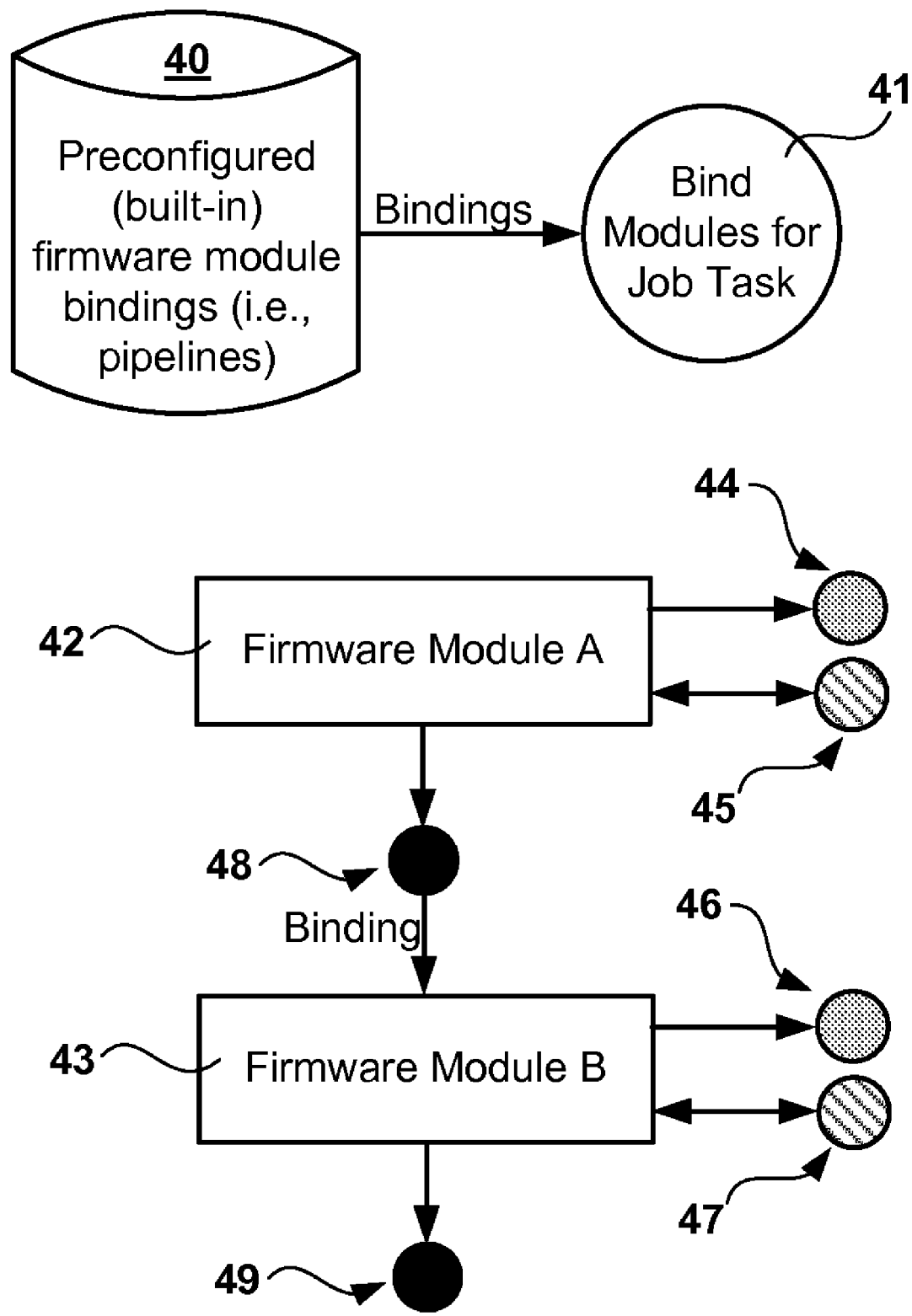
FIG. 4 is a diagram showing configurable firmware modules in a default configuration.

Some embodiments of the present invention may be described with reference to FIG. 4. In these embodiments, a default binding configuration is established. In these embodiments, a loader/linker 41 receives a job that requires only a default firmware configuration. Accordingly, the loader/linker 41 accesses pre-configured firmware modules and associated data 40 and configures the firmware for the default configuration. In the default configuration, firmware module A 42 outputs to its internal end-point 48, which is connected to the default input of firmware module B 43, which, in turn, outputs to its internal end-point 49. Modular end-points 44-47 are not used in the default configuration.

If temporary firmware module(s) associated with the processing pipeline and authenticated user login are present (e.g., removable or internal filing storage), the loader/linker will configure/bind the temporary firmware modules which override the default bindings.

In some embodiments, an FED/MFP may recognize the presence of a temporary firmware module on removable/external storage or internal storage. This recognition may be done through:

1. Special file name or naming convention.
2. Special file suffix.
3. Metadata associated with a file.
4. Special directory/folder within the storage.

In an exemplary embodiment, a temporary firmware module configuration may comprise two elements, a master index and one or more individual firmware modules. The master index may be a file with a predetermined name that is recognized by the FED/MFP. The contents may describe which preprocessing pipelines have temporary firmware modules, and how the firmware modules are bound. An exemplary master index is shown below:

```
<temporary-firmware>
    <preprocessing-pipeline name="A">
        <firmware-module name="T1" binding-type="binary">
            <end-point name="A1" type="external"/>
            <end-point name="T1" type="local" target="A2"/>
        </firmware-module>
    <preprocessing-pipeline>
</temporary-firmware>
```

In the above example, the master index may be interpreted as:
1. Binding information for a processing pipeline of the name "A".
2. The temporary firmware module "T1" has a binary binding type.
3. The temporary firmware module "T1" is bound to the 'external end-point' of firmware module "A1".
4. The output of temporary firmware module "T1" is bound to the input of firmware module "A2".

In some embodiments, if a temporary firmware module is present for a processing pipeline, the loader/linker may configure/bind the temporary firmware module according to its binding type. The binding type may identify an 'external' or 'loopback' end-point.

Figure 5:
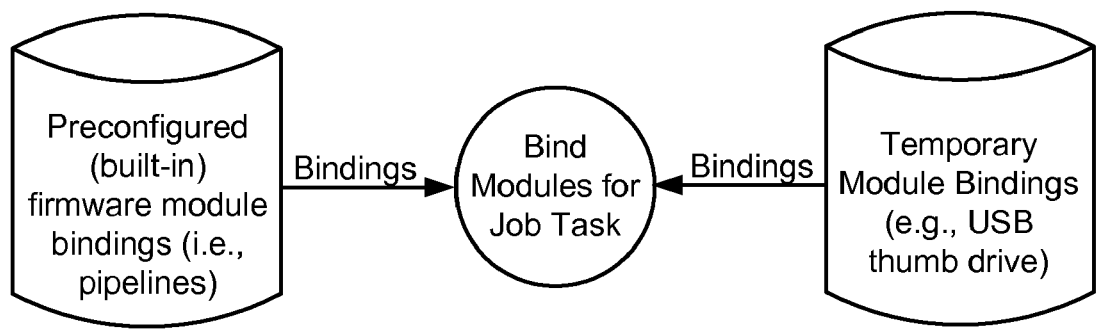
FIG. 5 is a diagram showing a resident configurable firmware module linked to a temporary module through a loop-back end-point.
Figure 5:
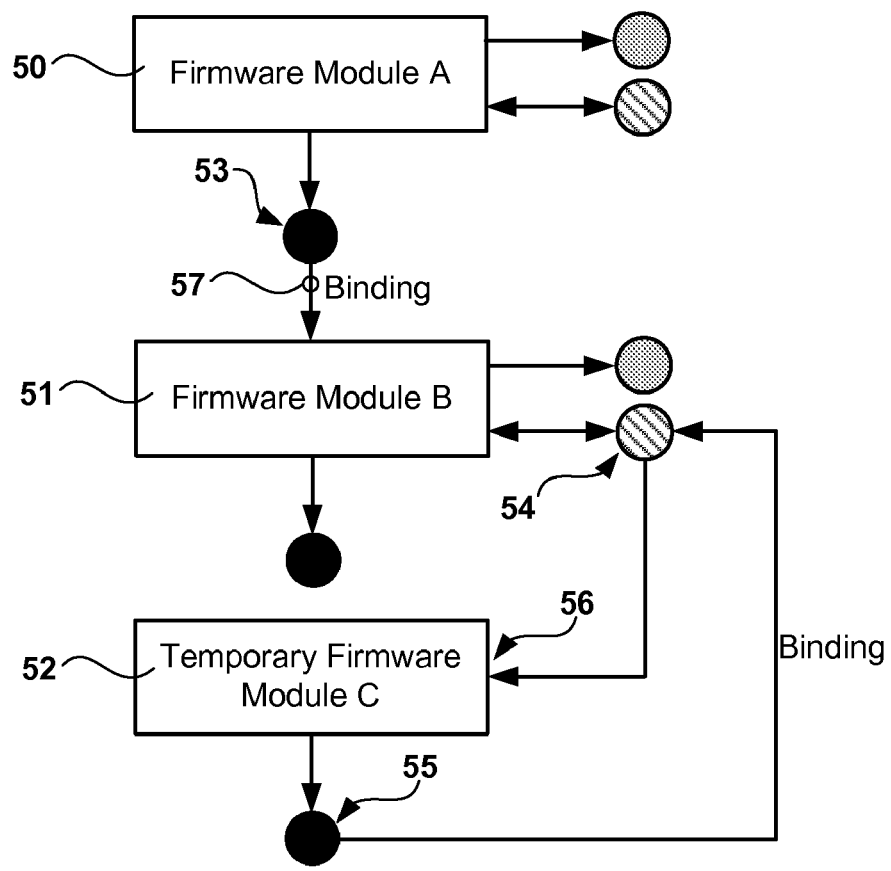
Figure 6:
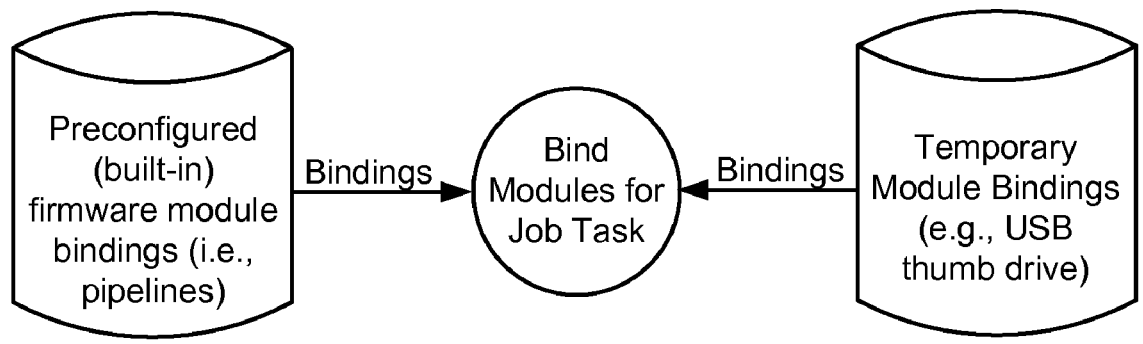
FIG. 6 is a diagram showing a resident configurable firmware module linked to a temporary module through an external end-point.
Figure 6:
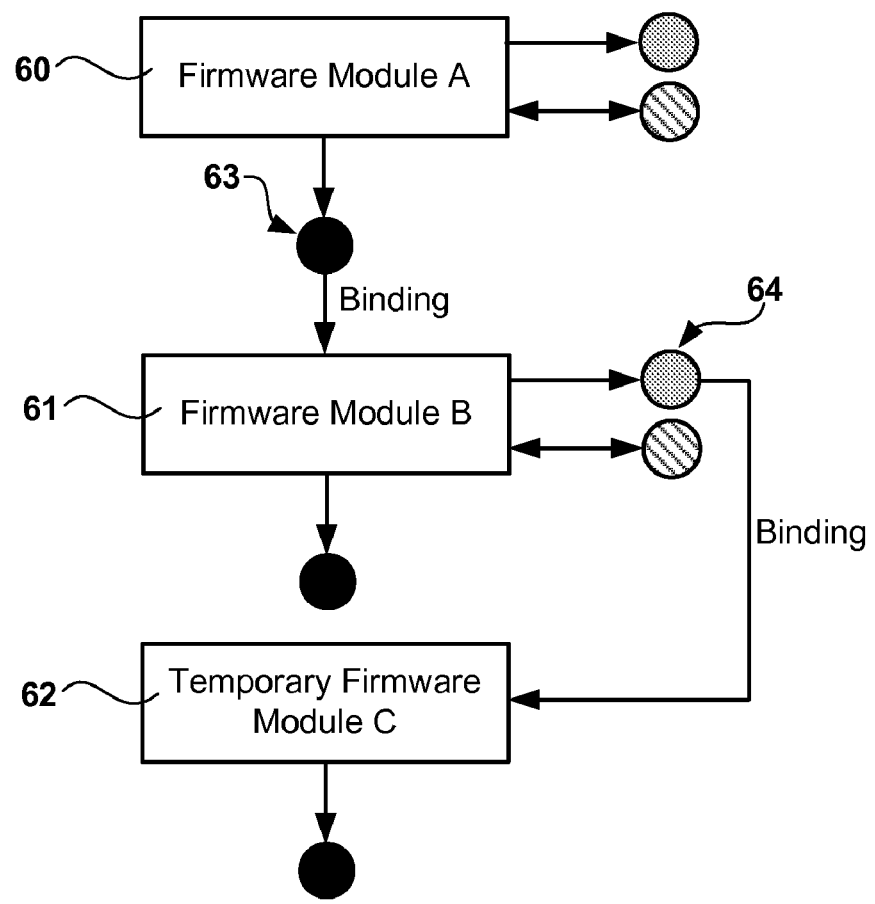

In an exemplary embodiment as illustrated in FIG. 5, when a loopback end-point 54 is identified, a temporary firmware module 52 may be inserted as a process between two existing connected firmware modules 50 and 51. In this configuration, the output 53 from the first firmware module 50 may be connected to the input 56 of the temporary firmware module 52, and the output 55 of the temporary firmware module 52 may be connected to the input of the second firmware module through the loop-back end-point 54. In the absence of the temporary firmware 52, the output 53 of the first firmware module 50 (i.e., default end-point) may have been connected 57 to the input of the second firmware module 51. In this manner input may enter the second firmware module 51, but be redirected through the loop-back end-point 54 to process the input before the usual processing of the second firmware module 51.

In another exemplary embodiment wherein an external end-point 64 is identified, a temporary firmware module 62 may be inserted as a new control flow path, where the output from the temporary firmware module 62 may be connected to a firmware module different than that defined by the default bindings. In this exemplary embodiment, output from firmware module A 60 is directed to firmware module B 61, which has been configured to output to external end-point 64 where output is directed to temporary module C 62 for further processing.

Figure 7:
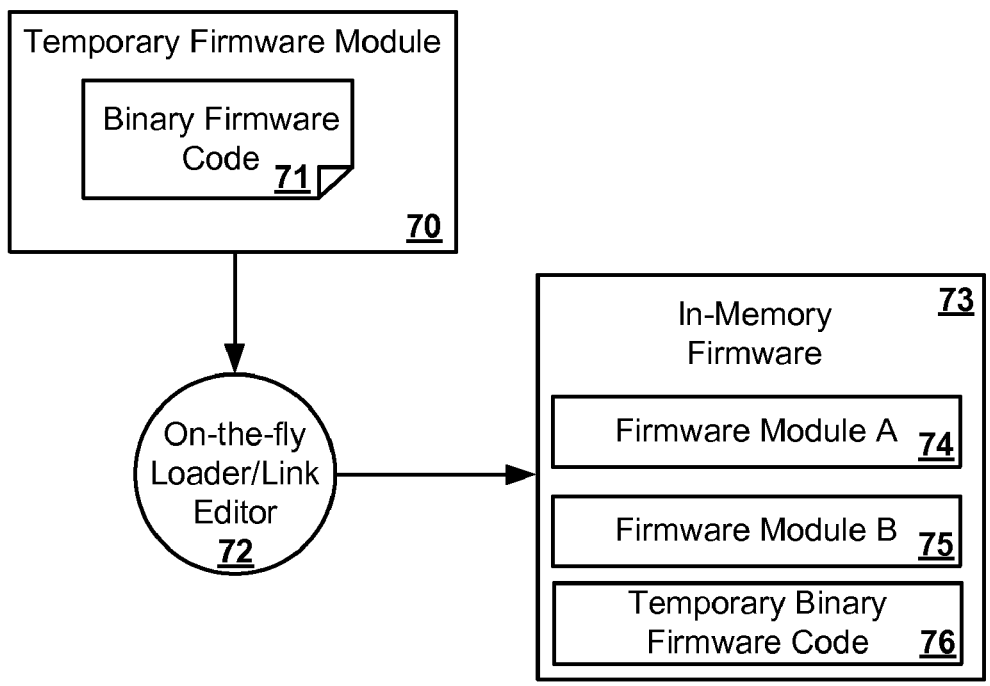
FIG. 7 is a diagram showing a binary coded module.
Figure 8:
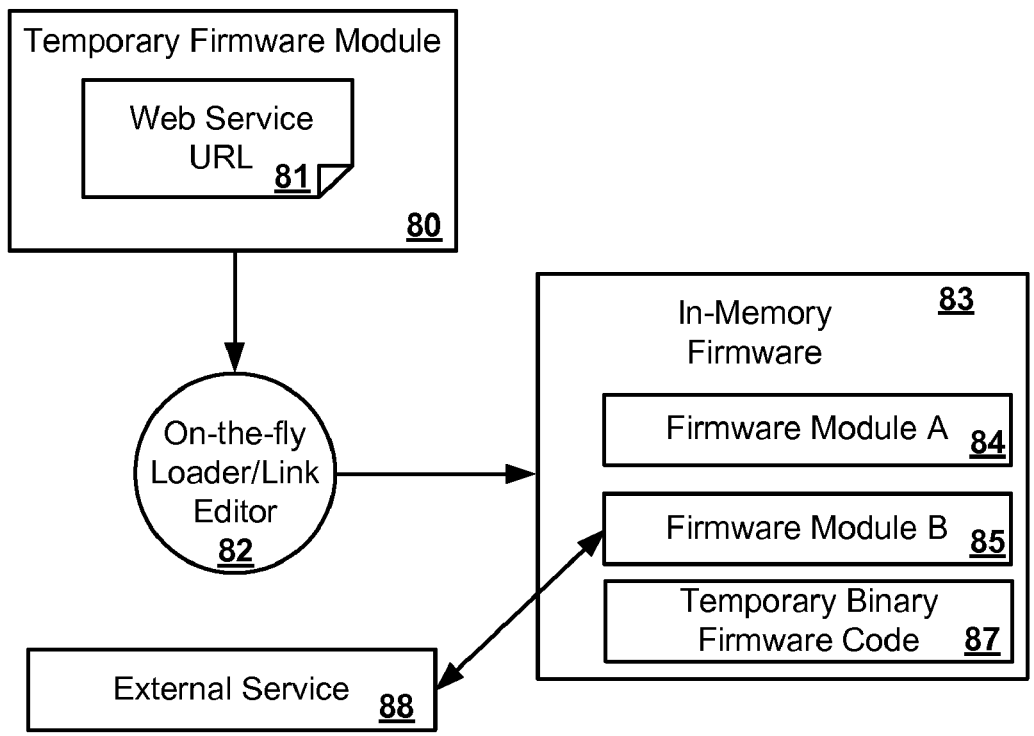
FIG. 8 is a diagram showing a web service embodiment of a temporary module.

In some embodiments of the present invention, as illustrated in FIG. 7, a temporary firmware module 70 may be a binary code module 71 or an externally hosted process. In embodiments where the module is a binary module 71, it may be a compiled module whose target platform is native to the FED/MFP device (or emulated by the device—e.g., Java running under JVM). In these embodiments, the loader/linker 72 can then load the module directly into the firmware's run-time memory 73, and bind the internal modules 74 and 75 directly to the loaded temporary module 76. The load and binding may then continue to persist as long as the temporary firmware module is present. In some embodiments, the binding may persist conditionally based on an associated, authenticated user login status.

Once the temporary firmware module 76 is absent and/or the associated authenticated user logs out, the temporary firmware module 76 may be unbound and the affected internal firmware modules may be rebound according to their default bindings. The temporary firmware code, however, may optionally persist in the device (i.e., cache) for use the next time the module is present or the next time the user logs into the device.

In other embodiments, the temporary firmware module 80 may be a URL reference 81 to a remotely stored version of the binary code. In this case, the URL reference 81 may be used to fetch and download (e.g., HTTP get/put, FTP get/put) the remotely stored binary coded module.

If the temporary firmware module 80 is a hosted process, the temporary firmware module 80 may comprise a reference 81 to an external interface 88 capable or invoking a hosted process. In some embodiments, the hosted process may comprise a web service. In other embodiments, a hosted processes may comprise:
1. RPC call
2. Executable file on a network mounted file system.
3. Active Server Web Page (e.g., aspx or .asmx).
4. Web Service In these embodiments, the loader/linker 82 may bind the internal firmware modules 84 and 85 to the hosted process according to a predefined interface definition (e.g., WSDL/Schema). In the case of a web service, when the internal firmware module 85 connects to the web service 86, the output from the internal firmware process may be serialized into a data packet (e.g., data contract) and pushed to a method exposed by the service (e.g., service contract) 88. The output from the host process may then be returned in a similar manner.

In some embodiments, once the temporary firmware module is absent or the authenticated login user logs out, the temporary firmware module may be unbound and the affected internal firmware modules may be rebound according to their default bindings.

In some embodiments, the hosted process may be defined in a scripting language which can be interpreted on-the-fly, and which is stored on a removable, external or internal storage. In this case, the loader/linker 82 may download the scripted code and either:
1. Run the scripted code within the device under a guest operating system/environment, or
2. Upload the scripted code to an external computing device (e.g., server) and instruct the external computing device to run the scripted code.

Figure 9:
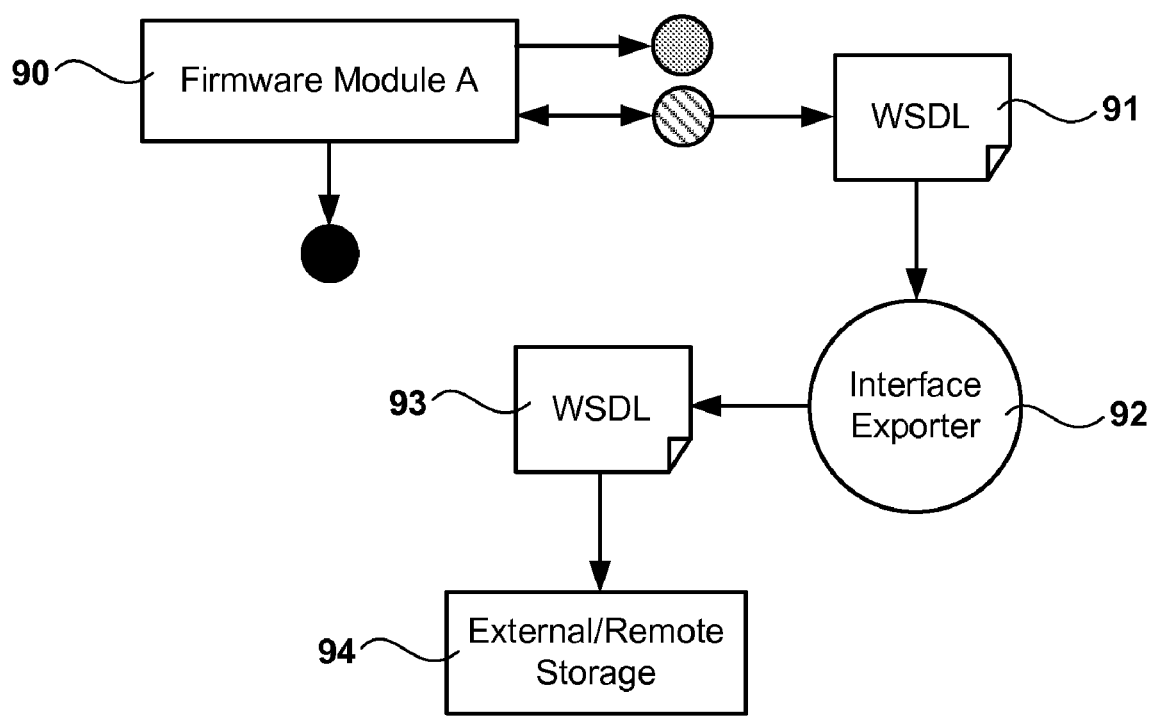
FIG. 9 is a diagram showing a method for exposing a configurable module's interface characteristics.

In some embodiments of the present invention, described in relation to FIG. 9, interface definitions for the end-points of an internal firmware module 90 (used by the load/linker to configure/bind) may be exported 91. In some embodiments, this interface definition may be a Web Service Description Language (WSDL) file 91. In some embodiments, this interface definition may be in a human-readable format. Export of the interface definition may be controlled by an interface exporter 92 that is part of the FED. In some embodiments, a control on the device may be activated (e.g., front panel control or network message) that invokes the interface exporter 92 thereby providing access to the module's interface definition. In some embodiments, upon activation, the exporter 92 may export a file, e.g., a text file, to a removable/external storage. In some embodiments, the text file may comprise a human readable definition of the interface, such as a WSDL/XML Schema format. The exported interface definition 93 may then be used by an end-user or a process to design/code a custom temporary firmware module, which will configure/bind to the internal firmware modules 90.

In some embodiments of the present invention, temporary firmware modules in a single pipeline may come from multiple sources. These sources may comprise removable, external or internal resources In some embodiments of the present invention, a temporary firmware module configuration with its associated bindings may be associated with a job task in an FED/MFP. In an exemplary embodiment, a temporary firmware binding might be used in both a print and a scan pipeline. In this case, the temporary firmware module may have two binding definitions, one for the print pipeline and one for the scan pipeline.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for linking resident firmware modules and non-resident temporary modules into a device pipeline, said method comprising:
    storing a plurality of configurable firmware modules accessible to a firmware-enhanced device (FED), wherein each of said configurable firmware modules comprises a plurality of configurable end-points that may be configured to create device pipelines for job tasks;
    receiving a job task at said FED;
    determining a firmware module configuration comprising a plurality of said configurable firmware modules linked with said configurable end-points, wherein said firmware module configuration forms a pipeline for executing said job task;
    configuring said configurable firmware modules according to said firmware module configuration to create a job task pipeline for said job task; and
    executing said job task using said job task pipeline.

2. A method as described in claim 1 wherein at least one of said configurable firmware modules is a temporary module that is remote to said FED and is accessed with a URL.

3. A method as described in claim 1 wherein said configuring comprises accessing a master index file and at least one temporary module file.

4. A method as described in claim 1 wherein at least one of said configurable end-points is one of an external end-point and a loop-back end-point each of which is configurable on-the-fly for said job task.

5. A method as described in claim 1 wherein said configurable end-points consist of an internal end-point, an external end-point and a loop-back end-point each of which is configurable on-the-fly for said job task.

6. A method as described in claim 1 further comprising receiving user ID data and authenticating a user and wherein said configuring is performed only when a user identified by said user ID is successfully authenticated.

7. A method for providing restricted-access device functionality, said method comprising:
    storing a plurality of configurable firmware modules accessible to a firmware-enhanced device (FED), wherein said configurable firmware modules comprise resident firmware modules and restricted, temporary modules and wherein each of said configurable firmware modules comprises a plurality of configurable end-points that may be configured on-the-fly to create device pipelines for job tasks;
    receiving a job task at said FED;
    receiving user authentication data at said FED;
    configuring said device to use at least one pipeline comprising a resident, configurable firmware module linked to a restricted, temporary module when said user authentication data is authenticated, wherein said at least one pipeline is configured to complete said job task; and
    configuring said device to use only pipelines comprising resident firmware modules when said authentication data is not authenticated.

8. A method as described in claim 7 wherein said resident, configurable firmware module comprises an external end-point.

9. A method as described in claim 7 wherein said resident, configurable firmware module comprises a loop-back end-point.

10. A method as described in claim 7 wherein said restricted, temporary module is on a removable device.

11. A method as described in claim 7 wherein said restricted, temporary module is on an external device.

12. A method as described in claim 7 wherein said configuring said device to use at least one pipeline comprising a resident, configurable firmware module linked to a restricted, temporary module comprises accessing a master index file and at least one individual firmware file on a remote device.

13. A method as described in claim 7 wherein said restricted, temporary module is loaded from a removable device.

14. A method for providing restricted-access device functionality, said method comprising:
    storing a plurality of configurable firmware modules accessible to a firmware-enhanced device (FED), wherein said configurable firmware modules comprise resident firmware modules and restricted, temporary modules and wherein each of said configurable firmware modules comprises a plurality of configurable end-points that may be configured on-the-fly to create device pipelines for device function requests;
    receiving a device function request, wherein said function requires a pipeline comprising a resident, configurable firmware module linked to a restricted, temporary module;
    determining whether said user is authenticated to use said restricted, temporary module; and
    configuring said device to use said pipeline comprising a resident, configurable firmware module linked to a restricted, temporary module when said user is authenticated to use said restricted, temporary module.

15. A method as described in claim 14 wherein said resident, configurable firmware module comprises an external end-point.

16. A method as described in claim 14 wherein said resident, configurable firmware module comprises a loop-back end-point.

17. A method as described in claim 14 wherein said restricted, temporary module resides on a removable device.

18. A method as described in claim 14 wherein said restricted, temporary module resides on an external device.

19. A method as described in claim 17 wherein said authentication for said user is provided automatically when said removable device is connected to said device.

20. A method as described in claim 17 wherein said determining comprises searching said removable device for user authentication data.

* * * * *